United States Patent [19]

Kuroda et al.

[11] Patent Number: 4,829,577

[45] Date of Patent: May 9, 1989

[54] SPEECH RECOGNITION METHOD

[75] Inventors: Akihiro Kuroda, Tokyo; Masafumi Nishimura, Yokohama; Kazuhide Sugawara, Tokyo, all of Japan

[73] Assignee: International Business Machines Corporation, Armonk, N.Y.

[21] Appl. No.: 25,257

[22] Filed: Mar. 12, 1987

[30] Foreign Application Priority Data

Mar. 25, 1986 [JP] Japan .................................. 61-65030

[51] Int. Cl.$^4$ ........................... G10L 1/00; G10L 5/00
[52] U.S. Cl. ......................................... 381/45; 381/43
[58] Field of Search ............................ 381/45, 43, 42; 364/513.5

[56] References Cited

U.S. PATENT DOCUMENTS

| 4,587,670 | 5/1986 | Levinson et al. | 381/43 |
| 4,593,367 | 6/1986 | Slack et al. | 364/513.5 |
| 4,718,094 | 1/1988 | Bahl et al. | 381/43 |
| 4,741,036 | 4/1988 | Bahl et al. | 381/43 |
| 4,748,670 | 5/1988 | Bahl et al. | 381/43 |
| 4,759,068 | 7/1988 | Bahl et al. | 381/43 |
| 4,783,803 | 11/1988 | Baker et al. | 381/43 |

OTHER PUBLICATIONS

"A Maximum Likelihood Approach to Continuous Speech Recognition" (IEEE Transactions on Pattern Analysis and Machine Intelligence, PAMI-vol. 5, No. 2, pp. 179-190, 1983, Lalit R. Bahl, Frederick Jelinek and Robert L. Mercer).

"Continuous Speech Recognition by Statistical Methods" (Proceedings of the IEEE-vol. 64, 1976, pp. 532-556, Frederick Jelinek).

"An Introduction to the Application of the Theory of Probabilistic Functions of a Markov Process to Automatic Speech Recognition" (The Bell System Technical Journal-vol. 62, No. 4, 1983, pp. 1035-1074, Apr., S. E. Levinson, L. R. Rabiner and M. M. Sondhi.

Primary Examiner—Gary V. Harkcom
Assistant Examiner—Christopher H. Lynt
Attorney, Agent, or Firm—Jack M. Arnold

[57] ABSTRACT

Speaker adaptation which enables a person to use a Hidden Markov model type recognizer previously trained by another person or persons. During initial training, parameters of Markov models are calculated iteratively by, for example, using the Forward-Backward algorithm. Adapting the recognizer to a new speaker involves (a) storing and utilizing intermediate results or probabilistic frequencies of a last iteration of training parameters, and (b) calculating new parameters by computing a weighted sum of the probabilistic frequencies stored during training and frequencies obtained from adaptation data derived from known utterances of words made by the new speaker.

4 Claims, 8 Drawing Sheets

# SPEECH RECOGNITION METHOD

FIELD FO THE INVENTION

The present invention relates to a speech recognition method using Markov models and more particularly to a speech recognition method wherein the adapting of Markov model statistics to speaker input can be easily performed.

BACKGROUND

In a speech recognition using Markov models, a Markov model is established for each word. Generally for each Markov model, plurality of states and transitions between the states are defined. For the transitions, occurrence probabilities and output probabilities of labels or symbols are assigned. Unknown speech is then converted into a label string and a probability of each word Markov model outputting the label string is determined based on the transition occurrence probabilities and the label output probabilities assigned to each respective word Markov model. The word Markov model having the highest probability of producing the label string is determined. The recognition is performed according to this result. In speech recognition using Markov models, the occurrence probabilities and label output probabilities (i.e., "parameters") can be estimated statistically.

The details of the above recognition technique are described in the following articles.

(1) "A Maximum Likelihood Approach to Continuous Speech Recognition" (IEEE Transactions on Pattern Analysis and Machine Intelligence, PAMI-Vol.5, No. 2, pp. 179-190, 1983, Lalit R. Bahl, Frederick Jelinek and Robert L. Mercer)

(2) "Continuous Speech Recognition by Statistical Methods" (Proceedings of the IEEE vol. 64, 1976, pp. 532-556, Frederick Jelinek)

(3) "An Introduction to the Application of the Theory of Probabilistic Functions of a Markov Process to Automatic Speech Recognition" (The Bell System Technical Journal vol. 62, No. 4, 1983, pp. 1035-1074, April, S. E. Levinson, L. R. Rabiner and M. M. Sondhi)

Speech recognition using Markov models generally needs a tremendous amount of speech data and the training thereof requires much time. Furthermore, a system trained with a certain speaker often does not get sufficient recognition scores for other speakers. And even for the same speaker, when there is a long time between the training and the recognition, there difference between the two events may result in poor recognition.

SUMMARY

As a consequence of the foregoing difficulties in the prior at, it is an object of the present invention to provide a speech recognition method wherein a trained system can be adapted for different circumstances (e.g., different speakers or the same speaker at different times), wherein the adaptation is easily performed.

In order to accomplish the above object, the present invention stores frequencies of events, which frequencies have been used for estimating parameters of Markov models during initial training. Frequencies of events are next determined based on adaption data, referring to the parameters of the Markov models. Then new parameters are estimated utilizing frequencies derived during training and during adaptation.

FIG. 2 shows examples of a trellis diagram illustrating label generation between states in a Markov model. In FIG. 2, the abscissa axis indicates passing time—in terms of generated labels—and the ordinate axis indicates states of Markov model. An inputted label string is shown as $W_1, w_2 \ldots w_l$ along the time axis. The state of the Markov model, while time passes, changes from an initial state I to a final state F along a path. The broken line shows all paths. In FIG. 2, the frequency of passing from the i-th state to the j-th state and at the same time outputting a label k is represented by a "count" $c^*(i,j,k)$. $c^*(i,j,k)$, the frequency of passing through the multiple paths indicated by the arrows in FIG. 2 and outputting a label k is determined from parameter probabilities $p(i,j,k)$. A $p(i,j,k)$ probability is defined as the probability of passing through from i to j and outputting k. In this regard, the frequency of the Markov model being at the state i ($S^*(i)$), as shown by the arc, is obtained by summing up frequencies $C^*(i,j,k)$ for each j and each k. From the definition of frequencies $C^*(i,j,k)$ and $S^*(i)$, a new parameter $P'(i,j,k)$—indicating the probability of traversing from state i to state j while producing a specific label k given that the process is at state i—can be obtained according to the following estimation equation.

$$P'(i,j,k) = C^*(i,j,k)/S^*(i)$$

Iterating the above estimation for various j and k values can result in relative probabilities $P_0(i,j,k)$ accurately reflecting $P'$ probabilities derived from the training data. Here the subscript zero indicates that the value is after training. Similarly, $S_0^*$ and $C_0hu *$ are values derived from training.

According to the present invention, frequencies $C_1^*(i,j,k)$ and $S_1^*(i)$ derived from adaptation speech data are obtained using training data probabilities $P_0(i,j,k)$. The new "after adaptation" probability $P_1(i,j,k)$ is determined from training and adaptation data as follows.

$$P_1(i,j,k) = \{(\lambda)C_0^*(i,j,k) + (1-\lambda)C_1^*(i,j,k)\}/\{(\lambda)S_0^*(i) + (1-\lambda)S_1^*\}$$

where $0 \leq \lambda \leq 1$

The frequencies needed for estimation are determined by interpolation. This interpolation renders the probability parameters $P_0(i,j,k)$, obtained by the initial training, adapatable to different recognition circumstance.

According to the present invention, $C_0^*(i,j,k) = P_0(i,j,k) \times S_0^*(i)$. From this relationship, the following estimation is derived.

$$P1(i,j,k) = \{(\lambda)P_0(i,j,k) \cdot S_0^*(i) + (1-\lambda)C_1^*(i,j,k)\}/\{(\lambda)S_0^*(i) + (1-S_1^*(i)\}$$

Hence, the frequency $C_0^*(i,j,k)$ need not be stored.

When initial training data is significantly different from adaptation data, it is desirable to make use of the following term instead of $P_0(i,j,k)$.

$$(1-\mu)P_0(i,j,k) + \mu e \quad 0 \leq \mu \leq 1$$

Here is a certain small constant number, preferably 1/(the number of the labels)x(the number of the branches).

In the preferred embodiment to be hereinafter described, probabilities of each proceeding from one state to another state and outputting a label are used as probabilistic parameters of Markov models, though transition occurrence probabilities and label output probabilities may be defined separately and used as parameters.

DESCRIPTION OF A PREFERRED EMBODIMENT

Figure 1:
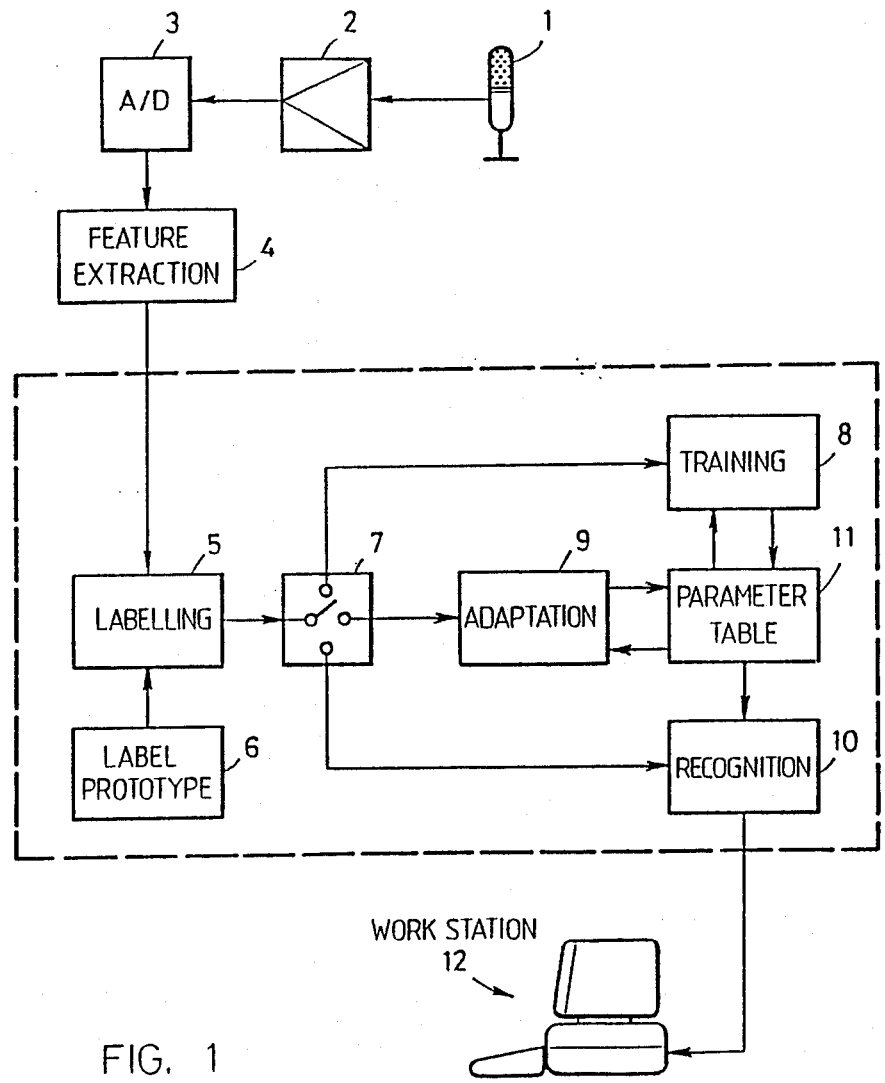
FIG. 1 is a block diagram illustrating one embodiment of the invention.
Figure 2:
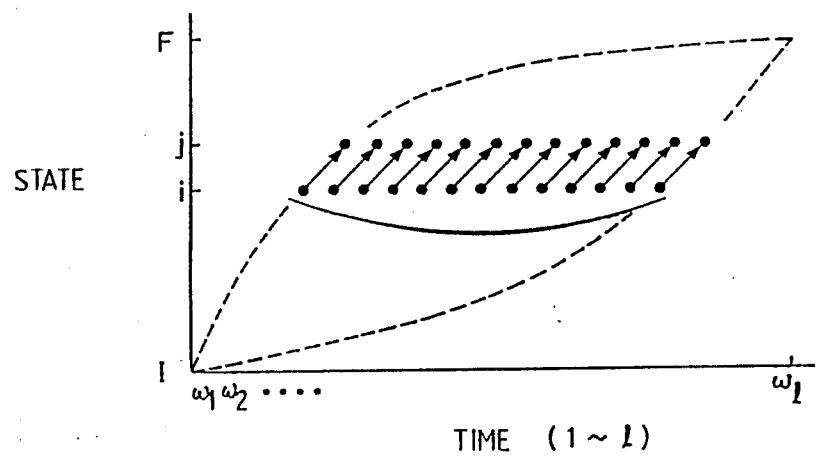
FIG. 2 is a diagram for describing the invention.

In FIG. 1 inputted speech data is supplied to an analog/digital (A/D) converter 3 through a microphone 1 and an amplifier 2. A/D converter 3 transforms uttered speech into digital data, which is then supplied to a feature extracting block 4. The feature extracting block 4 can be an array processor made by Floating Point Systems Inc. In the feature extracting block 4, speech data is at first discrete-Fourier-transformed every ten milliseconds using a tweny millisecond-wide window. The Fourier-transformed data is then outputted at each channel of a 20 channel band pass filter and is subsequently provided to a labelling block 5. Labelling block 5 performs labelling by referring to a label prototype dictionary 6. In particular, speech is, by known methods, characterized as a plurality of clusters where each cluster is represented by a respective prototype. The number of prototypes in the present embodiment is 128.

Figure 3:
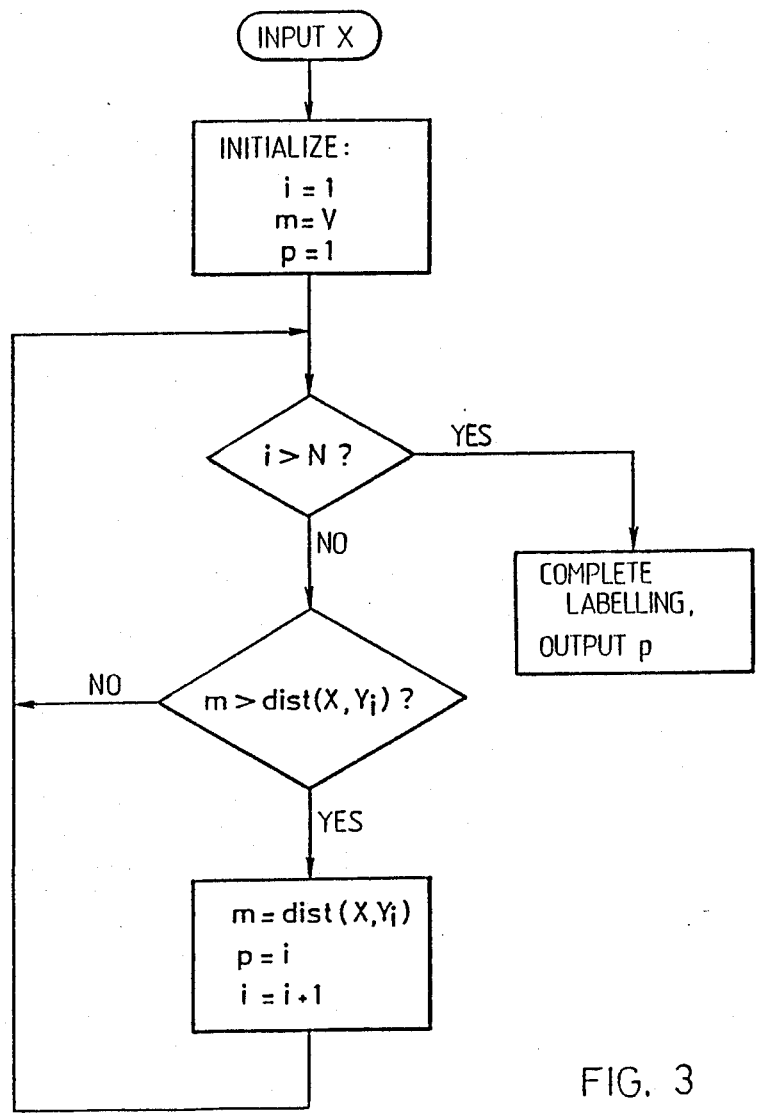
FIG. 3 is a flow chart describing the operation of the labeling block 5 of the example shown in FIG. 1.

The labelling is for example performed as shown in FIG. 3, in which X is the inputted feature from block 4, $Y_i$ is the feature of the i-th prototype in the dictionary 6, N is the number of the all prototypes(=128), dist(X, Yi) is the Euclid distance between X and $Y_i$, and m is the minimum value among previous dist(X,$Y_i$)'s. m is initialized to a very large number. As shown in the FIG., inputted features X's are in turn compared with each feature prototype, and for each inputted feature the most similar prototype (that is, the prototype having the shortest distance) is outputted as an observed label or label number P.

The labelling block 5 outputs a label string with an interval of ten millisec. between consecutive labels.

The label string from the labelling block 5 is selectively provided to either a training block 8, an adaptation block 9, or a recognition block 10 through a switching block 7. Details regarding the operation of the training block 8 and the adaptation block 9 will be given later with reference to FIG. 4 and FIGS. thereafter. During initial training the switching block 7 is switched to the training block 8 to direct the label string thereto. The training block 8 determines parameter values of a parameter table 11 by training Markov model using the label string. During adaptation, the switching block 7 is switched to the adaptation block 9, which adapts the parameter values of the parameter table 11 based on the label string. During recognition, the switching block 7 is switched to the recognition block 10, which recognizes inputted speech based on the label string and the parameter table. The recognition block 10 can be designed according to Forward-backward algorithm calculations or Viterbi algorithms which are discussed in the above article (2) in detail. The output of the recognition block 10 is provided to a workstation 12 and is displayed on its monitor screen.

In FIG. 1 the blocks surrounded by the broken line are implemented in software on a host computer. An IBM 3083 processor is used as the host computer, and the IBM conversational monitoring system CMS and PL/1 are used as an operation system and a language, respectively. The above blocks can also be implemented in hardware.

The operation of the training block 8 will be next described in detail.

Figure 5:
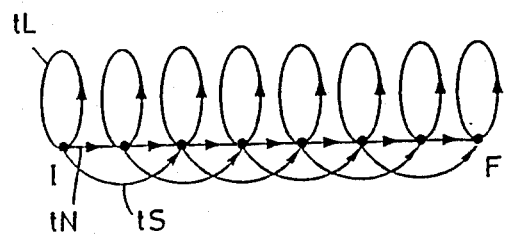
FIG. 5, FIG. 6 and FIG. 7 are diagrams for describing the flow of the operation shown in FIG. 4.
Figure 4:
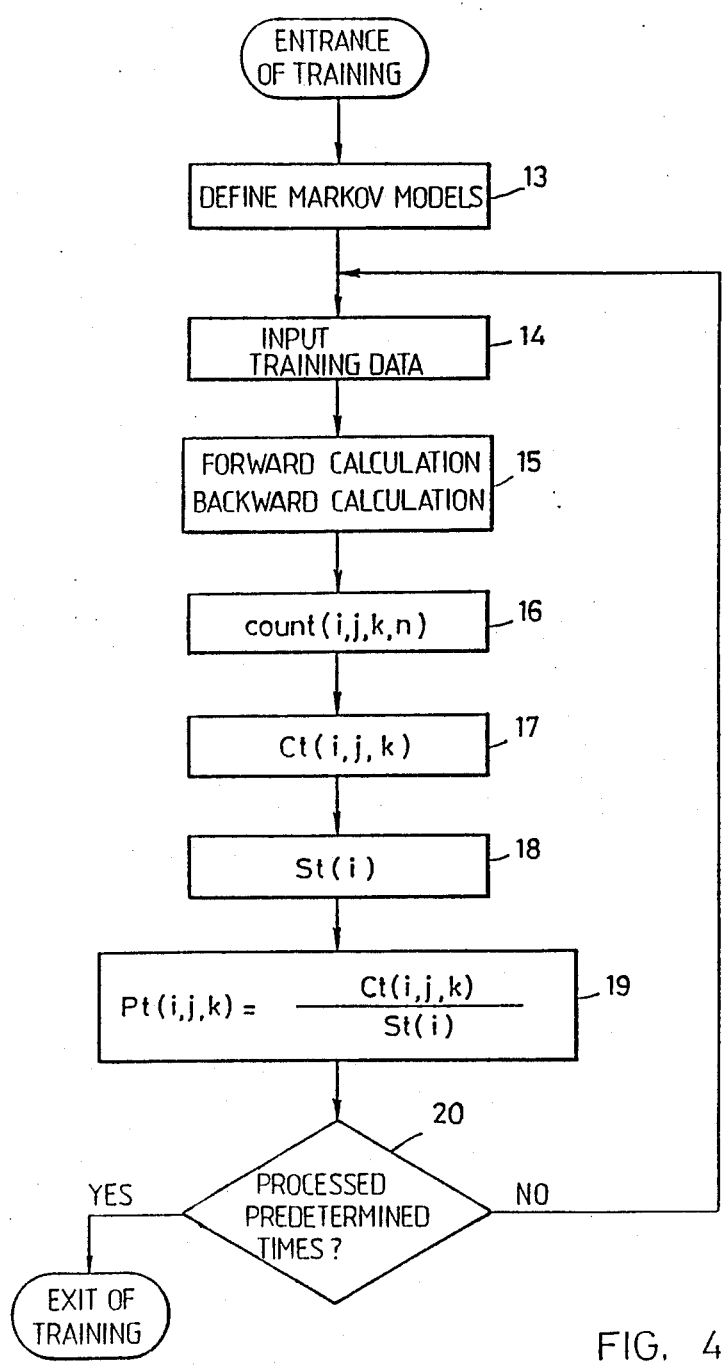
FIG. 4 is a flow chart describing the operation of the training block 8 of the example shown in FIG. 1.

In FIG. 4 showing the procedure of the initial training, each word Markov model is first defined, step 13. In this embodiment the number of words is 200. A word Markov model is shown in FIG. 5. In this FIG., small solid circles indicate states and arrows show transitions. The number of states including the initial state I and the final State F is 8. There are three types of transitions, that is, transitions to the next states tN, transitions skipping one state tS, and transitions looping the same state tL. The number of labels in a label string corresponding to one word is about 40 to 50. The label string of the word is related to the word Markov model from the initial state to the final state thereof, looping sometimes and skipping sometimes. In training, probabilities for a given word model are determined based on the string(s) of labels generated when the given word is uttered.

Figure 6:
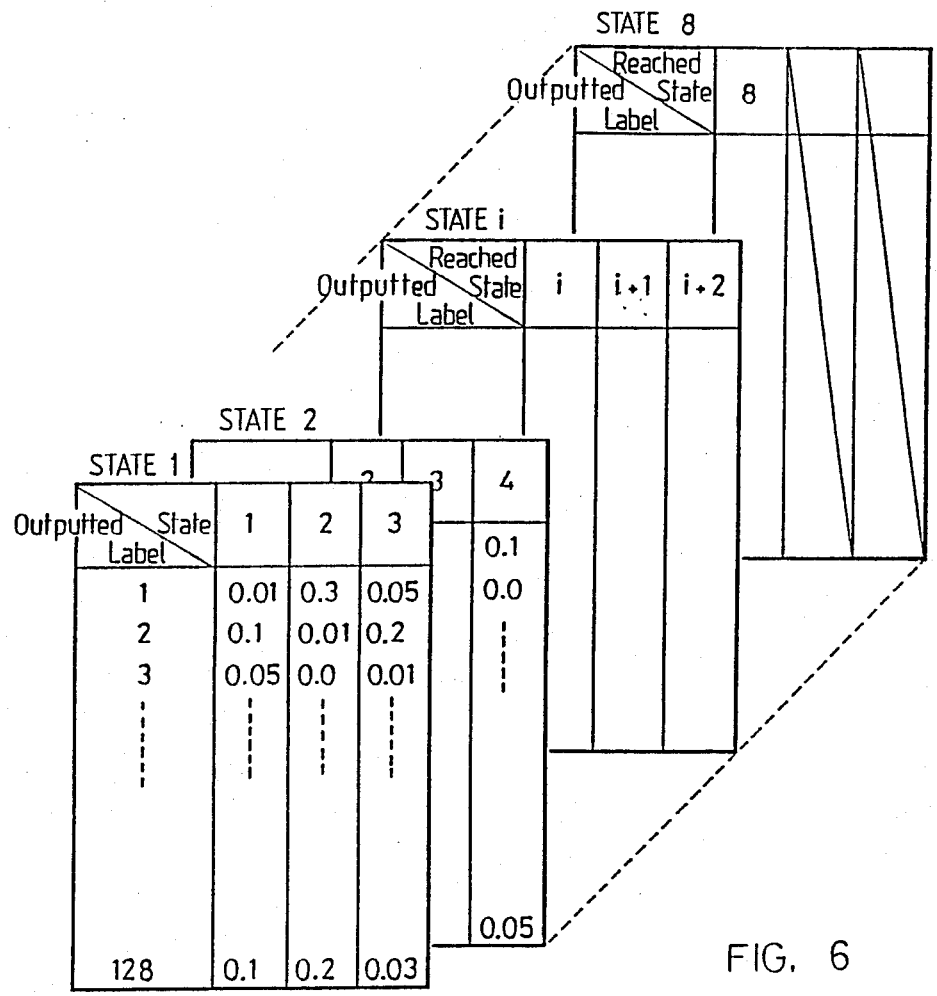

To define the Markov models involves establishing the parameter table of FIG. 1 tentatively. In particular, for each word a table format as shown in FIG. 6 is assigned and the probability parameters P(i,j,k) are initialized. The parameter P(i,j,k) refers to the probability that a transition from the state i to the state j occurs in a Markov model, and that a label k is produced at that i→j transition. Furthermore in this initialization, the parameters are set so that (a) a transition to the next state, (b) a looping transition, and (c) a skipping transition have respective probabilities of 0.9, 0.05 and 0.05. One each transition in accordacne with the initialization, all labels are produced at equal probability, that is 1/128.

After defining word Markov models, initial training data is inputted, step 14, which data has been obtained by speaking 200 words to be recognized five times. Five utterances of a word have been put together and each utterance has been prepared to show which word it responds to, and in which order it was spoken. Here let U=(u$_1$, u$_2$, . . . ,u$_5$) to indicate a set of five utterances of one specified word. Each utterance $u_n$ corresponds to a respective string of labels.

After completing the inputting of the initial training data, the Forward calculation and Backward calculation in accordance with the forward-backward algorithm are performed, step 15. Though the following procedure is performed for each word, for convenience of description, consideration is only given to a set of utterances of one word. In Forward calculation and Backward calculation the following forward value f(i,x,n) and backward value b(i,x,n) are calculated.

f(i,x,n): the frequency that the model reaches the state i at time x after starting from the initial state at time 0 for the label string $u_n$.

b(i,x,n): the frequency that the model extends back to the state i at the time x after starting from the final state at time $r_n$ for the label string $u_n$.

Forward calculation and Backward calculation are easily performed sequentially using the following equations.

Forward Calculation

For $x = 0$ $f(i,0,n) = 1$ if $i = 1$ 0 otherwise

For $1 \leq x \leq r_n$ $$f(i,x,n) = \Sigma^2 \{f(i-k, x-1, n) \cdot P_{t-1}(i-k, i, w_{nx})\}$$
$$K = 0$$

wherein $P_{t-1}$ is the parameter stored in the parameter table at that time, k is determined depending on the Markov model, and in the embodiment k=0, 1, or 2.

Backward Calculation

For $x = r_n$, $b(i,x,n) = 1$ if $i = E$, 8 for the case 0 otherwise

For $0 \leq x \leq r_n$, $$b(i,x,n) = \Sigma^2 \{b(i+k, x+1, n) \cdot P_{t-1}(i, i+k, w_{nx+1})\}$$
$$K = 0$$

wherein E is the number of the states of the Markov model.

After completing the Forward and Backward calculations, the frequency that the model passes from the state i to the state j outputting the label k for the label string $u_n$, namely the count (i,j,k,n), is then determined. The count (i,j,k,n) is based on the forward value f(i,x,n) and the backward value b(i,k,n) for the label string $u_n$, step 16 according to the following expression:

count $(i,j,k,n)$ $$= \sum_{x=1}^{r_n} (\delta(W_{nx}, k) \cdot f(i, x-1, n) \cdot b(j, x, n) \cdot P_{t-1}(i, j, w_{nx}))$$

wherein $\delta(w_{nx}, k) = 1$ if $w_{nx} = k$ 0 otherwise

Figure 7:
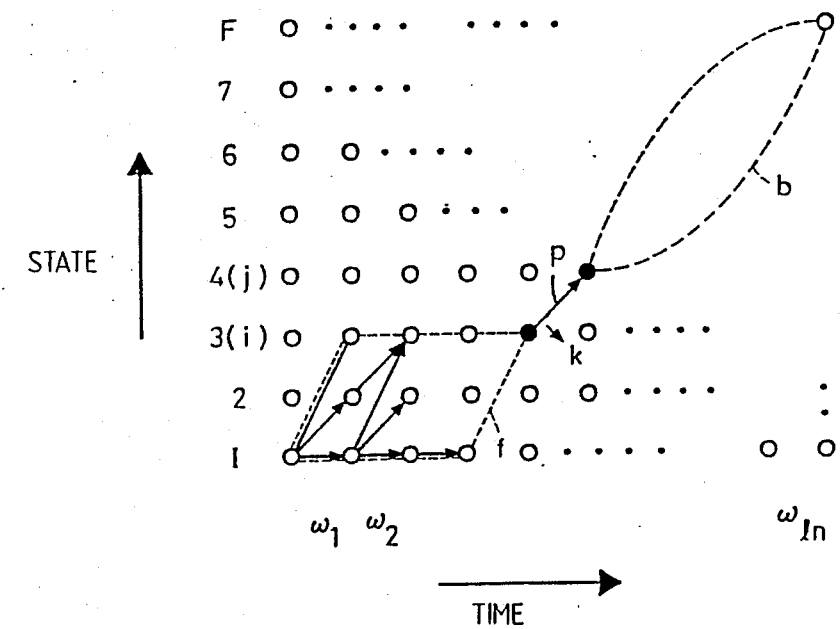

The above expression can be interpreted with reference to FIG. 7, which shows a trellis diagram for matching a word Markov model against the label string $u_n$ ($= w_{n1} w_{n2} \ldots w_n r_n$). (For simplicity, the n subscript has not been included in FIG. 7). $u_n(w_{nx})$ is depicted along the time axis. When $w_{nx} = k$, that is, delta($w_{nx}, k$)=1, the $w_{nx}$ is circled. The condition $w_{nx} = k$ occurs when the label output considered in the word Markov model and the $w_{nx}$ label in the generated string are the same. Reference is now made to the path accompanied by an arrow and extending from the state i (state 3 in FIG. 7) to the state j (state 4 in FIG. 7) at the observing time x, at which the label $w_{nx}$ occurs. Both ends of the path are indicated by small solid circles in FIG. 7.

In this case, the probability that the Markov model produces $k = w_{nx}$ is $P_{t-1}(i, j, w_{nx})$. Furthermore, the frequency that the Markov model extends from the initial state I to the solid lattice point of the state i at the time x−1 (as shown by the broken line f) is represented by the forward value f(i,x−1,n), and on the other hand the frequency that it extends back from the final state F to the solid lattice point of the state j at the time x (as shown by the broken line b) is represented by the backward value b(j,x,n). The frequency that $k = w_{nx}$ is outputted on the path p is therefore as follows.

$f(i, x-1, n) \cdot b(j, x, n) \cdot P(i, j, w_{nx})$

Count(i,j,k,n) is obtained by summing up the frequencies of circled labels for which the operation of $\gamma(w_{nx}, k)$ yields 1. The count (i,j,k,n) for an utterance is thus expressed using the aforementioned expression.

At this point it is noted that, in arriving at State i, (e.g., state 3) after (x−1) previous labels, there may be a variety of possible paths. The count calculation accounts for these various paths. For example, if x=5, it means four labels in the string were generated before state 3 was reached. This situation could result from three self-loop transitions $T_L$ at state I followed by a (horizontal) $T_N$ transition (see transition f in FIG. 7) or could result from a $T_L$ transition at state I followed by a $T_N$ transition between states I and 3, which is followed by two $T_L$ transistions at state 3. The paths are limited by the structure of the word Markov model.

After obtaining count(i,j,k,n) for each label string $u_n$(n=1 to 5), the frequency $C_t(i,j,k)$ over a set of label strings, U, is obtained, step 17. It should be noted that label strings $u_n$ are different from each other and that the frequencies of the label strings $u_n$, or total probabilities of the label strings $T_n$ are different from each other. Frequency count(i,j,k,n) should be therefore normalized by the total probability $T_n$. Here $T_n = f(E, 1_n, n)$ with E=8 in this specific embodiment.

The frequency over the whole training data of the word to be recognized, $C_t(i,j,k)$, is determined as follows.

$$\sum_{n=1}^{5} \frac{1}{T_n} \text{count}(i,j,k,n)$$

Next the frequency that Markov model is at the state i over the training data for the word to be recognized, $S_t(i)$ is determined likewise based on count(i,j,k,n), (step 18).

$$S_t(i) = \sum_{n=1}^{5} \frac{1}{T_n} (\sum_{jk} \sum \text{count}(i,j,k,n))$$

Based on the frequencies $C_t(i,j,k)$ and $S_t(i)$, the next parameter $P_{t+1}(i,j,k)$ is estimated as follows, (step 19).

$P_t(i,j,k) = C_t(i,j,k)/S_t(i)$

The above estimation process, or procedures of steps 14 through 19 is repeated a predetermined number of times (for example, five times) to complete the training of the target words, step 20. For other words the same training is performed.

After completing the training, the final "after training" parameter Po(i,j,k)—i.e., $P_t$ after the predetermined number of processing cycles—is determined for the parameter table, FIG. 1, to be used for speech recognition which follows. The frequency which has been used for the last round of the estimation in step 18, $S_o(i)$, is also stored. This frequency $S_o(i)$ is to be used for the adaptation, which will be hereinafter described.

Figure 8:
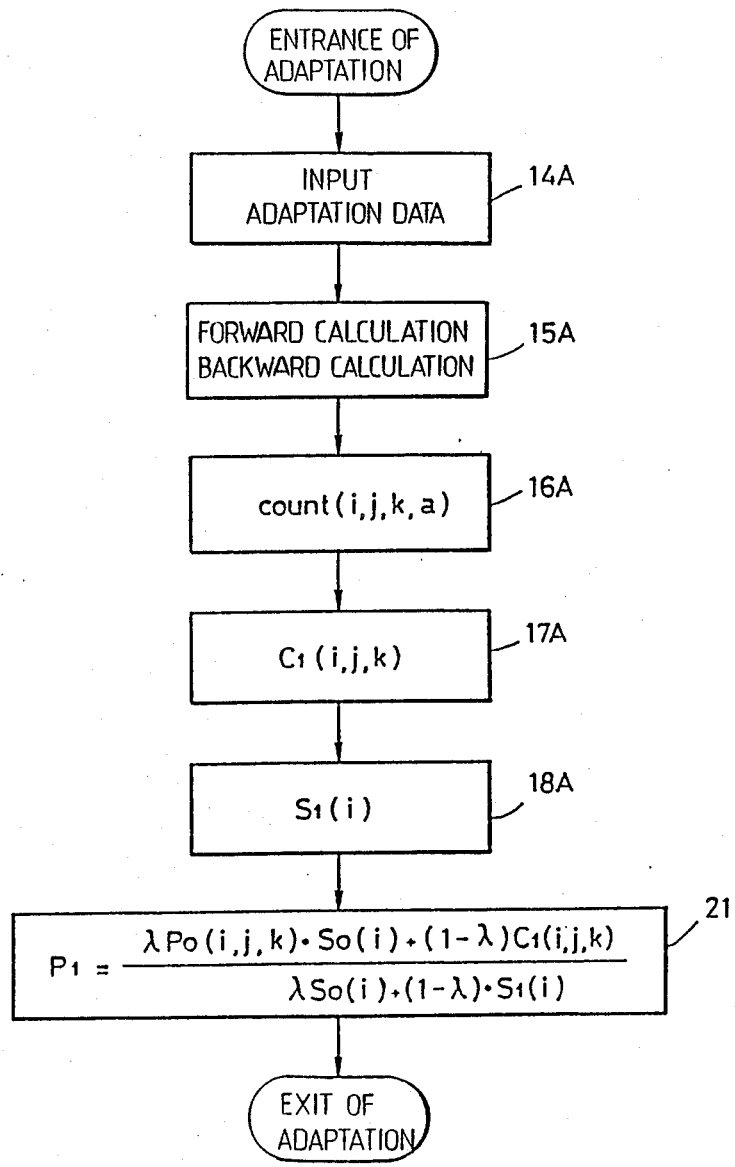
FIG. 8 is a diagram for describing the operation of the adapting block of the example shown in FIG. 1.

The operation of the adaptation block 9 will be next described referring to FIG. 8. In FIG. 8 parts having counterparts in FIG. 4 are given the corresponding reference numbers, and detailed description thereof will not be given.

In FIG. 8 adaptation data is inputted (Step 14A) by a speaker whose speech is to be recognized later. For purposes of adaptation, the speaker utters each word once. After this, the operations shown in the steps 15A through 18A are performed in the same way as in the case of the above mentioned training. Then two frequencies which are to be used for estimation are obtained respectively by interpolation. The new parameter $P_1(i,j,k)$ is obtained as follows, (Step 21);

$$P1(i,j,k) = \frac{(\lambda)C_0(i,j,k) + (1 - \lambda)C_1(i,j,k)}{(\lambda)S_0(i) + (1 - \lambda)S_1(i)}$$

wherein $0 \leq \lambda \leq 1$

In this example the adaptation process is performed only once, though that process may be repeated. It is observed that Co (i,j,k) is equal to Po(i,j,k).So(i), so the following expression is used for the estimation of $P1(i,j,k)$.

$$P1(i,j,k) = \frac{(\lambda)P_0(i,j,k) \cdot S_0(i) + (1 - \lambda)C_1(i,j,k)}{(\lambda)S_0(i) + (1 - \lambda)S_1(i)}$$

"a" of count (i,j,k,a) in FIG. 8 shows that this frequency corresponds to the label string for the adaptation data. The $P_1$ values are now available for storage in the parameter table for use in recognizing the speaker's subsequent utterances.

After performing the steps mentioned above the adaptation is completed. From now on the speech of the speaker for whom the adaptation has been done is better recognized.

According to this embodiment the system can be adapted for a different circumstance with small data and short training time.

Additional optimization of the system can be achieved by adjusting the interior division ratio, λ, according to the quality of the adaptation data such as reliability.

Assuming that the numbers of Markov models, branches, and labels are respectively X, Y, Z, then the amount of data increased due to by S(i) is X. On the other hand, the amount of data increased by $P_0(i,j,k)$ is XYZ. Therefore the amount of the data increased by this adaptation is very small:

$$X/XYZ = 1/YZ$$

This embodiment also has an advantage that a part of software or hardware can be made common to the adaptation process and the intial training process because both processes have many identical steps.

Furthermore, adaptation can be repeated for a word wrongly recognized because adaptation is performed on a word-wise basis. Needless to say, adaptation for a word might not be performed until the word is wrongly recognized.

A modification of the above-mentioned embodiment will be next described. Adaptation can be performed well through this modification when the quality of the adaptation data is quite different from that of the initial training data.

Figure 9:
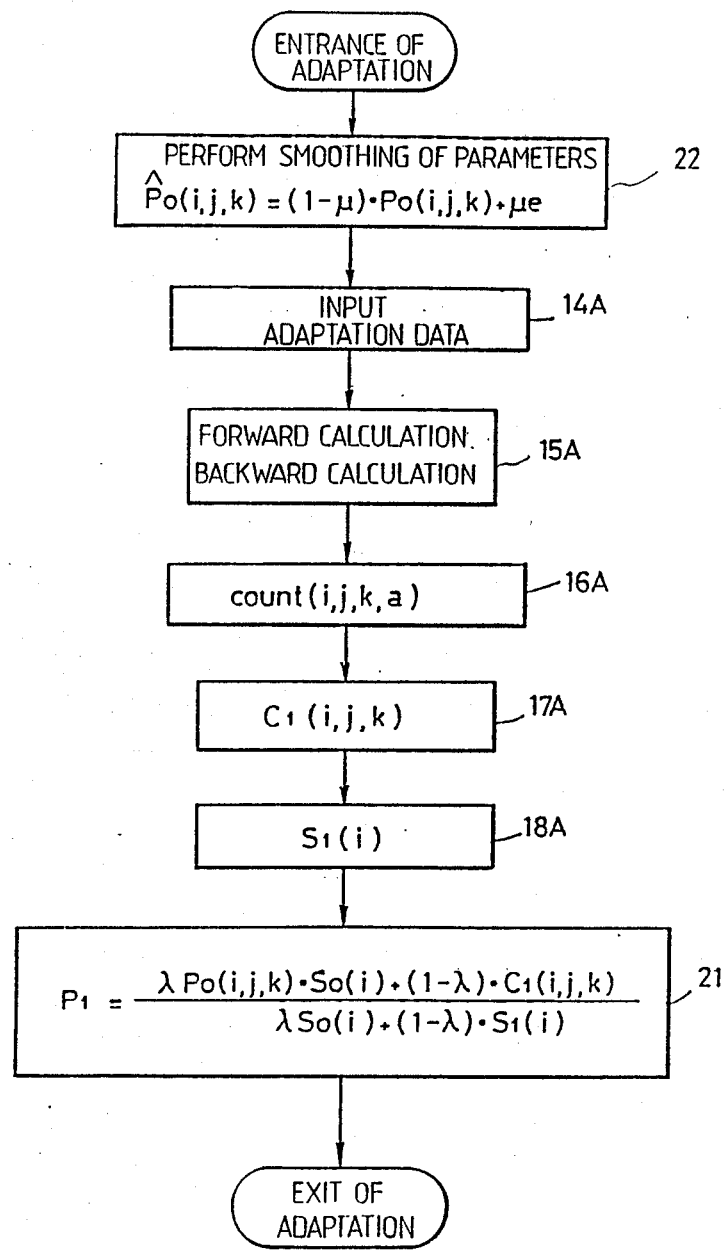
FIG. 9 is a flow chart describing the modified example of the example shown in FIG. 1.

FIG. 9 shows the adaptation process of this modified example. In this FIG., parts having counterparts in FIG. 8 are given the corresponding reference numbers, and detailed description thereof will not be given.

In the modified example shown in FIG. 9. an interpolation using $P_0(i,j,k)$ is performed as follows, (step 22), before the new frequencies, $C_1(i,j,k)$ and $S_1(i)$ are obtained from the adaptation data.

$$P_0(i,j,k) = C(1-\mu)P_0(i,j,k) + \mu e$$

The value obtained by interpolating the parameter $P_0(i,j,k)$ based on a small value e and an interior division ratio $\mu$ is utilized as the new parameter. In the training process during the adaptation process, how well parameters converge to actual values also depends heavily on initial values. Some paths which occurred rarely for initial training data may occur frequently for adaptation data. In this case adding a small number e to the parameter $P_0(i,j,k)$ provides a better convergence.

As described hereinbefore, according to the present invention, adaptation of a speech recognition system can be done with a small amount of increased data and short time. The required storage capacity, the increase in the number of program steps, and required hardware components are also respectively very small. Additionally optimization of the system can be achieved by adjusting the interior division ratio according to the quality of the adaptation data.

Having thus described our invention, what we claim as new, and desire to secure by Letters Patent is:

1. A speech recognition method based on recognizing words, comprising the steps of:
   defining, for each word, a probabilistic model including (i) a plurality of states, (ii) at least one transition, each transition extending from a state to a state, (iii) a plurality of generated labels indicative of time between states, and (iv) probabilities of outputting each label in each of said transitions;
   generating a first label string of said labels for each of said words from initial data thereof;
   for each of said words, iteratively updating the probabilities of the corresponding probabilistic model, comprising the steps of:
   (a) inputting a first label string into a corresponding probabilistic model;
   (b) obtaining a first frequency of each of said labels being output at each of said transitions over the time in which the corresponding first label string is input into the corresponding probabilistic model;
   (c) obtaining a second frequency of each of said states occurring over the time in which the corresponding first label string is inputted into the corresponding probabilistic model; and
   (d) obtaining each of a plurality of new probabilities of said corresponding probabilistic model by dividing the corresponding first frequency by the corresponding second frequency;
   storing the first and second frequencies obtained in the last step of said iterative updating;

determining which of said words require adaptation to recognize different speakers or the same speaker at different times;

generating, for each of said words requiring adaptation, a second label string from adaptation data comprising the probabilistic model of the word to be adapted;

obtaining, for each of said words requiring adaptation, a third frequency of each of said labels being outputted at each of said transitions over the time in which the corresponding second label string is inputted into the corresponding probabilistic model;

obtaining, for each of said words requiring adaptation, a fourth frequency of each of said states occurring over the time in which the corresponding second label string is outputted into the corresponding probabilistic model;

obtaining fifth frequencies by interpolation of the corresponding first and third frequencies;

obtaining sixth frequencies by interpolation of the corresponding second and third frequencies; and obtaining adapted probabilities for said adaptation data by dividing the corresponding fifth frequency by the corresponding sixth frequency.

2. The method in accordance with claim 1 wherein each of said first frequencies is stored indirectly as a product of the corresponding probability and the corresponding second frequency for a given word.

3. The method in accordance with claim 2 wherein each of the probabilities of the said probabilistic model into which adaptation data is to be inputted have been subjected to smoothing operation.

4. The method in accordance with claim 1 wherein each of probabilities of the said probabilistic model into which adaptation data is to be inputted have been subjected to a smoothing operation.

* * * * *